United States Patent

Kierce

[15] 3,667,037
[45] May 30, 1972

[54] POCKET SIZE INTEGRATED CIRCUIT LOGIC ANALYZER

[72] Inventor: Eugene F. Kierce, Ballston Lake, N.Y.
[73] Assignee: The General Electric Company
[22] Filed: Nov. 12, 1969
[21] Appl. No.: 875,997

[52] U.S. Cl. .......................................... 324/73 R, 324/133
[51] Int. Cl. ................................. G01r 15/12, G01r 19/14
[58] Field of Search .................. 324/158, 158 F, 73, 51, 127, 324/158 P, 72.5, 133; 339/174, 176 M

[56] References Cited

UNITED STATES PATENTS

| | | | |
|---|---|---|---|
| 2,015,316 | 9/1935 | Miller | 314/73 X |
| 2,023,947 | 12/1935 | Auble | 324/73 X |
| 2,724,821 | 11/1955 | Schweitzer, Jr. | 324/127 X |
| 2,823,304 | 1/1958 | Shiels | 324/158 X |
| 2,974,275 | 3/1961 | Haviland | 339/174 X |
| 3,333,188 | 7/1967 | Eagle | 324/73 |
| 3,573,617 | 4/1971 | Randolph et al. | 324/158 F |

Primary Examiner—Rudolph V. Rolinec
Assistant Examiner—Ernest F. Karlsen
Attorney—Francis K. Richwine, Frank L. Neuhauser, Joseph Forman, Irving M. Freedman and Oscar Waddell

[57] ABSTRACT

A method and apparatus employing a plurality of leads corresponding in number and respectively engaging the leads of a flat pack to be tested as it is functioning under power in circuit, wherein a plurality of flat pack function indicating lights are powered by a plurality of flat pack lamp drivers that receive their power from the power input of the flat pack to be tested and receive their operating signals from the remaining leads of the flat pack to be tested. The entire unit is compact and may be clipped in the pocket of an operator. The input leads are cantilevered springs biased away from corresponding slots within a housing head that fits over the flat pack to be tested. The power for driving the analyzer is received solely from the circuit board containing therein the flat pack to be tested and the lamp drivers assure that there will be no material alteration in the flat pack to be tested as it operates in circuit.

9 Claims, 11 Drawing Figures

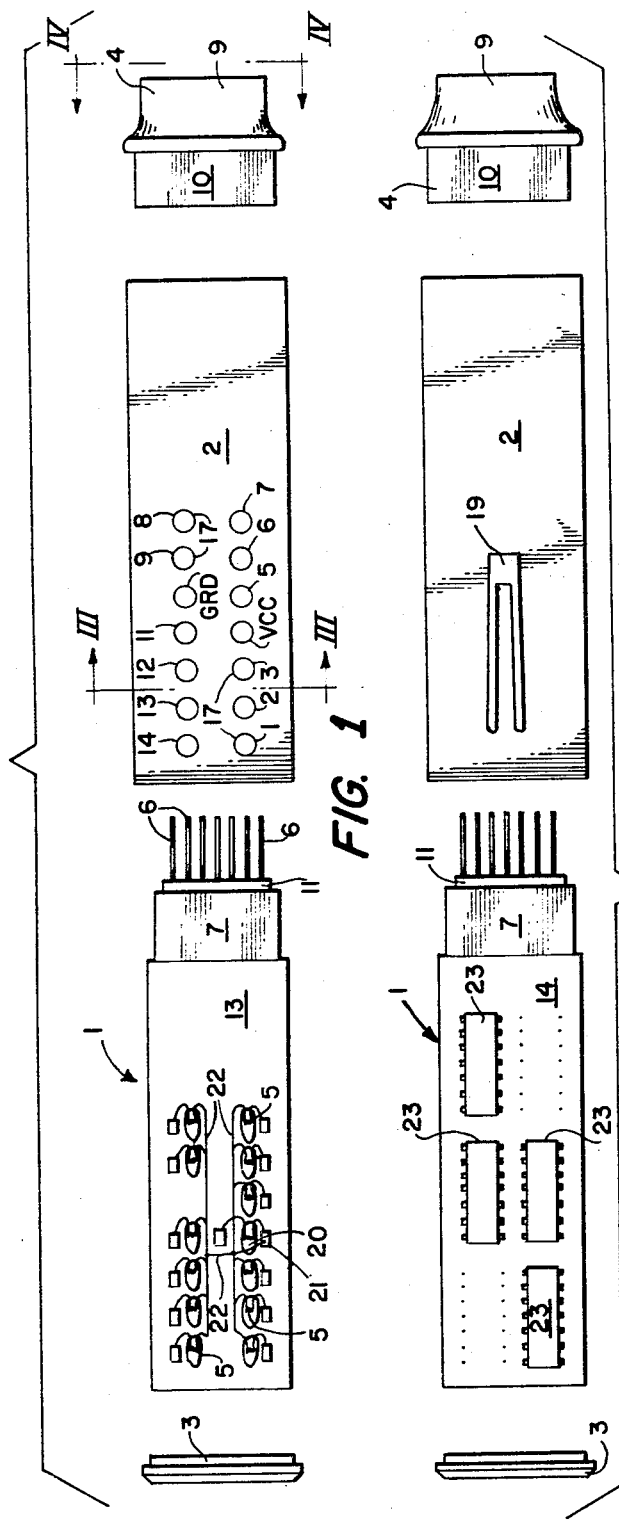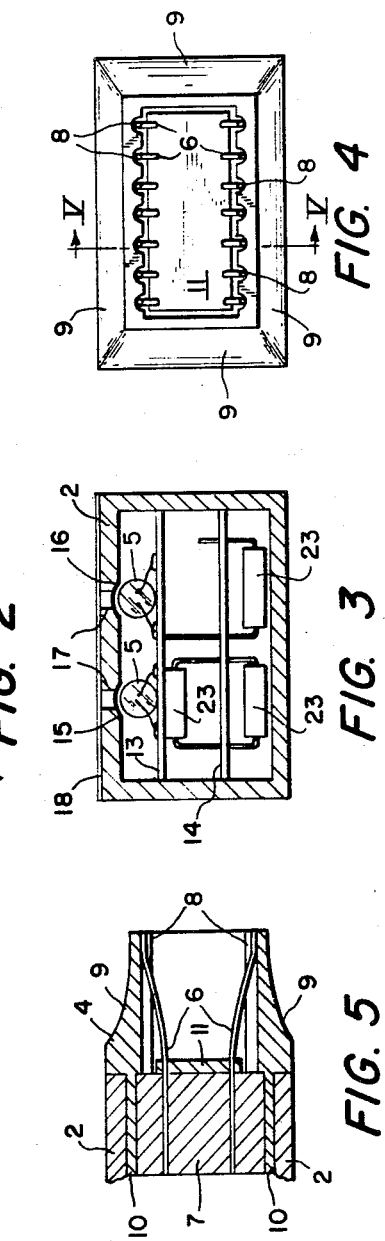

INVENTORS
EUGENE F. KIERCE

BY Charles W. Helzer
ATTORNEY

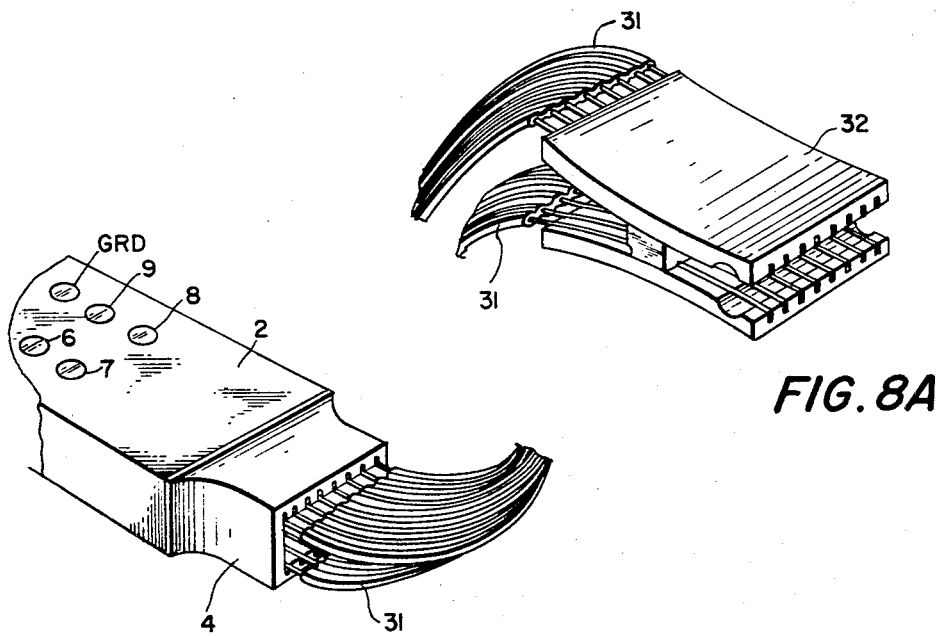
FIG. 8A
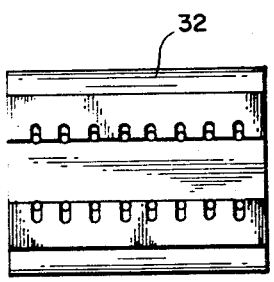
FIG. 8B
FIG. 8D
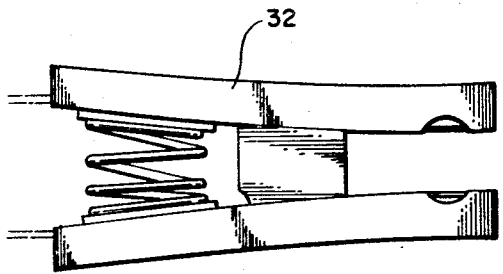
FIG. 8C
INVENTOR
EUGENE F. KIERCE
BY Charles W. Helzer
ATTORNEY

POCKET SIZE INTEGRATED CIRCUIT LOGIC ANALYZER

BACKGROUND OF THE INVENTION

A particular problem exists with respect to trouble shooting integrated circuits, particularly SUHL-type integrated circuits such as flat packs, dual-in-line packages, etc. after they are assembled into printed circuit boards. Each board could contain up to forty dual-in-line packages, flat packs, and the like, wired in complex logic circuits, which by present means of trouble shooting would require the tedious and time-consuming use of oscilloscopes. There is a very definite need in the industry to test these integrated circuits without disassembly, without danger to any of the components in the circuit and preferably while they are functioning and under power. For field usage, the tester or analyzer should be highly mobile.

SUMMARY OF THE INVENTION

The analyzer of the present invention is compact in size so that it may be carried within the pocket of an operator for field use. A recessed head of the analyzer housing is placed over the integrated circuit such as a dual-in-line package (hereinafter referred to as DIL), flat pack, etc. to be tested so that it will use the relatively rigid body of the flat pack or DIL for aligning a plurality of analyzer input leads with the leads of the integrated circuit to be tested. Each of these input leads is preferably a cantilevered leaf spring contained in and spaced from the bottom of a corresponding slot within the housing recess so that it may resiliently engage its associated lead of a particular DIL, flat pack, etc. to be tested with good electrical contact. The power input for the DIL being tested as it operates in circuit is used to power the analyzer and particularly to furnish the power for a plurality of DIL lamp drivers responsive to the signals with the remaining input leads for operating a plurality of indicator lamps. Each lamp is associated with an indicia on the housing, for convenience in correlating the energization of a particular lamp with the DIL function or information it signifies. Preferably, the number of lamps correspond in number to the number of leads of the DIL to be tested, with the exclusion of the ground lead, with one lamp indicating that power is being received by the DIL to be tested from its associated power supply circuit.

The analyzer housing is preferably of three parts, a tubular body containing therein the lamps and lamp drivers, an interchangeable closure cap for one end of the tubular body, and a dual-in-line receiving head containing therein the input leads and being mounted on the opposite end of the tubular body.

With the use of lamp drivers, the analyzer circuit is substantially isolated from the circuit of the DIL to be tested, that is, it will not materially affect the functioning of the DIL to be tested so that there will be no danger thereto or to the other components in the circuit with the DIL to be tested. With the use of power from the circuit to be tested, the analyzer is simultaneously able to test the presence of such power and eliminate the use of self-contained or outside power sources that would add to the size of or materially limit the use of the analyzer.

BRIEF DESCRIPTION OF THE DRAWINGS

Further objects, features and advantages of the present invention will become more clear from the following detailed description of the drawing, wherein:

FIG. 1 is an exploded or assembly view of a preferred embodiment of the analyzer, taken from above;

FIG. 2 is an exploded or assembly view of the preferred embodiment of the analyzer taken from below;

FIG. 3 is a cross-sectional view taken along line III—III of FIG. 1 and rotated 90° in the counter clockwise direction;

FIG. 4 is an end view taken in the direction of arrow IV of FIG. 1 with the same orientation of FIG. 3;

FIG. 5 is partial cross-sectional view of the analyzer in its assembled position, taken along line V–V of FIG. 4;

FIG. 8a–8d is a perspective view of still another form of analyzer according to the invention which includes flexible leads and a detachable clip for use in testing hard-to-reach integrated circuits.

DETAILED DESCRIPTION OF THE DRAWINGS

Figure 6:
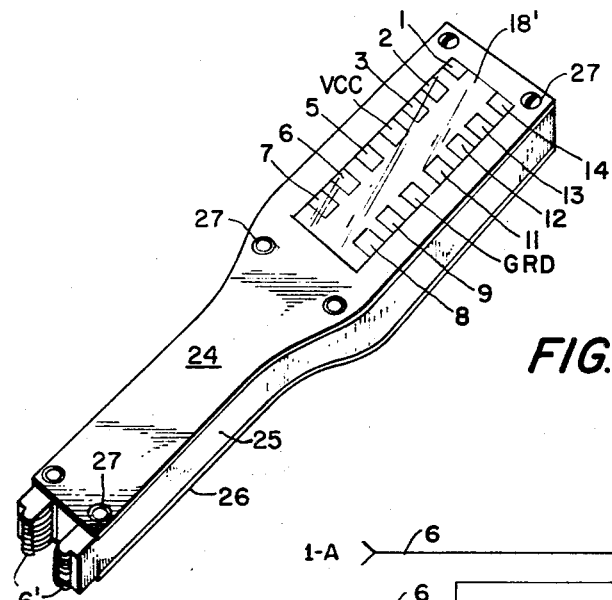
FIG. 6 is a perspective view of a further modification of the present invention.

As shown in FIG. 1, the analyzer of the present invention employs a circuit component 1 that is received within a three-part housing comprising a rectangular cross-section tubular one-piece portion 2, which is preferably constructed of suitable synthetic plastic, a one-piece synthetic plastic end cap 3 that is designed to close the left hand end of the tubular portion 2 by telescoping therein, with suitable cement to form the bond, and a DIL engaging head 4 that will telescope in the opposite end of the tubular portion 2. In the specific illustrated embodiment, the DIL to be tested has 14 leads; correspondingly, there are 14 respective positions on the top of the tubular portion 2 represented by corresponding numbers, except for an indication for input power corresponding to lead 4 and an indication for ground corresponding to lead 10. Immediately under each of these positions there is a corresponding signal lamp 5, with the exception of the ground position. When a proper signal is associated with any one of the leads of the dual-in-line package to be tested, the corresponding lamp 5 will be lit, so that it will correspondingly light up one of the positions 1–14 on the top of the tubular portion 2. A plurality of input leads 6 are provided on the analyzer for forming an electrical connection with the corresponding leads of the DILP to be tested.

The input leads 6 of the analyzer are metallic strips that are embedded in a suitable synthetic plastic 7 to extend therefrom in the manner of cantilevered leaf springs outwardly into the head 4. The head 4 is tubular as shown in FIG. 5, and formed with a plurality of slots 8, which correspond in number to the number of leads on the DILP to be tested and the number of input leads 6. The input leads 6 preferably extend to the right and outwardly as shown in FIG. 5 so that they are spaced a suitable distance from the bottom of their corresponding slots, which distance diminishes toward the right. With such an arrangement, the input leads 6 will engage the corresponding leads of the DILP to be tested and spring outwardly forming good electrical contact as the body of the DILP to be tested is telescoped within the correspondingly shaped head 4. For this purpose the internal configuration of the head 4 substantially corresponds to the external configuration of the DILP to be tested so that it forms a guide for positioning the input leads 6 with respect to the leads of the DILP to be tested. Also, the head 4 protects the input leads 6 from damage when the analyzer is being transported and the like. As shown in FIG. 5, the right-hand portion of the head 4 is necked-down in cross-sectional area to the right of 9 to form a sufficiently strong structure while at the same time providing a minimum of bulk that must be accommodated around the DILP to be tested, so that the analyzer will not interfere with the normal positioning of the electrical components in circuit with the DILP to be tested. It should be noted that by appropriate design any specific head 4 can be used with a particular Integrated Circuit. Thus by making a number of different interchangeable heads 4, the integrated circuit logic analyzer readily can be adapted for use with a number of different types of integrated circuits.

As shown in FIG. 5, the one-piece head 4 includes a flange 10 around its entire rectangular periphery, which telescopes over the plastic portion 7 of the circuit component with friction bond or a suitable sealing and bonding cement being applied therebetween. Also, the flange 10 is received within the tubular portion 2 with friction bonding or additional sealing and bonding cement therebetween. Preferably the plastic portion 8 is a suitable potting compound and if necessary, a further seal 11 may be provided at the base of the cantilevered input leads 6. The inner ends of the input leads 6 are respectively soldered to suitable connections (not shown) on two printed circuit boards 13 and 14. From FIG. 4, it is seen that the input leads 6 are arranged in two parallel layers, which are immediately adjacent the two parallel circuit boards 13 and 14 as shown in FIG. 3; thus, the top layer of input leads 6 is soldered to the top circuit board 13 while the bottom layer of input leads 6 is soldered to the bottom circuit board 14.

Immediately above each lamp 5, there is a corresponding bore 17 through the top wall of the tubular portion 2 to allow the signal from the associated lamp 5 to be seen by an operator of the analyzer. A printed transparent or translucent, preferably plastic, sheet is bonded to the top wall of the tubular portion 2 so that it will form a seal for each of the bores 17 and provide the indicia shown in FIG. 1 for identification of each of the signals produced by the lamps 5. On the bottom wall of the tubular portion 2, there is provided a conventional integrally molded plastic or bonded metallic clip 19, in FIG. 2, so that the analyzer may be worn within the pocket of an operator during transport without the danger of falling out. For this purpose, the analyzer is preferably ½ inch × ½ inch × 4 ½ inches. Preferably, the printed sheet 18 is photographically manufactured.

Figure 7:
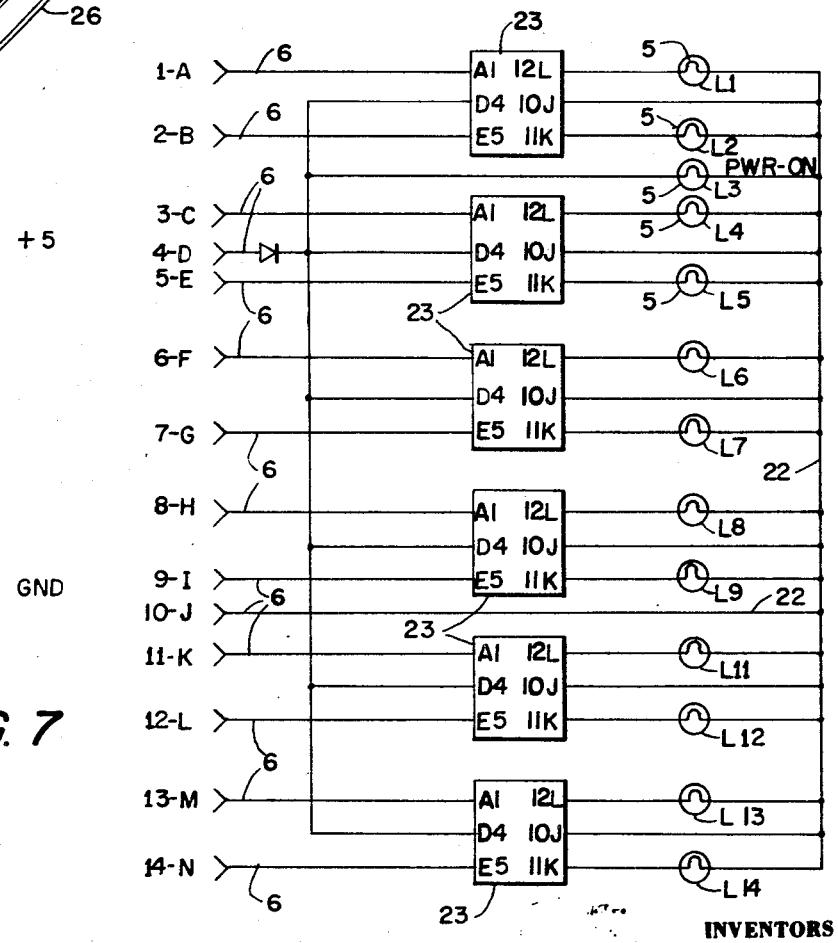
FIG. 7 is a schematic wiring diagram showing the association of the analyzer input leads, the associated lamps and the corresponding lamp driver flat packs.

As previously mentioned, the circuit component 1 employs a plurality of lamps 5 that have their leads connected as shown to the various positions on the printed circuit board 13. The lamp in the power input position corresponding to the fourth position associated with the indicia of FIG. 1 provides the power input for the entire analyzer and as shown this lamp 20 is connected with a suitable ground 21 so that it will light when power is received by the analyzer, that is, when the dual-in-line package to be tested is under power. A plurality of leads 22 are connected with ground 21 to provide common grounds for all the lamps 5 as shown. The inputs for these lamps are associated with the particularly identified output terminals of DILP lamp drivers 23. In the preferred embodiment of the present invention, these dual-in-line lamp drivers are Sylvania-SG130–SUHL-Type integrated circuits which are commercially available and have specific known internal circuitry. The internal circuitry and operating characteristics have been described in the open literature which is incorporated herein by reference. The wiring connection between the lamp drivers 23, the lamps 5, and the input leads 6 is schematically shown in FIG. 7; it being understood that additional capacitors and resistances are included as an integral part of dual-in-line lamp drivers as is well-known in the art. The input leads 6 which are designed to probe the particular test DIL terminals noted to the left of leads 6 in FIG. 7, are connected to the respective ones of the input terminals of DILP lamp drivers 23 as shown in FIG. 7.

Thus it is seen that the analyzer of the present invention is completely self-contained in that it receives operating power and signals solely from the DIL to be tested as it operates in its associated circuit environment. All of the components 1–4 preferably are sealingly bonded together in any one particular analyzer so that in cooperation with the printed sheet 18, the entire interior of the analyzer is sealed.

As previously mentioned, the connections for the input leads 6, lamps 5 and lamp drivers 23 are shown in the schematic of FIG. 7, with corresponding input and output connections noted. To left of each input lead 6 is the standard nomenclature associated with SUHL DILP which are the preferred type of DILP to be tested. The pocket-size integrated circuit logic analyzer of the preferred embodiment of the present invention will work on all the present types of SUHL logic circuits, such as NANDs, NORs, Lamp Drivers, Flip-flops and Expanders. By means of the lights 5 the analyzer will indicate the logic level of each input and output that the assembled DIL package being tested is seeing, that is, analyzes all logic functions. The use of the lamp drivers serves to isolate the DIL and the test circuit, while drawing a small amount of power from the power input of the flat pack to be tested as it operates in circuit. Thus, the DIL to be tested may be analyzed while it is still on the circuit board and functioning under power, which is particularly important, not only with respect to saving time in analyzing circuits, but also with respect to avoiding any damage to the components in the circuit being tested, which might result if external voltages were applied thereto by the analyzer.

The standard nomenclature for each of the flat packs 23 is shown in FIG. 7 for the leads that are in circuit. Also, each of the lamps 5 is labeled for correspondence with the positions on the top of the analyzer as shown in FIG. 1; for example, lamp 5 that is labeled L5 is associated with position 5 in FIG. 1 and input lead 5E of the input leads 6.

A modification or alternate embodiment of the present invention is shown in FIG. 6 which could be used in testing flat packs which differ in configuration from the DIL. The housing is constructed of three components, that is, a top cover plate 24, a central body 25, and a lower cover plate 26 which are secured together by means of rivets or screws 27. The top cover plate 24 is provided with a printed sheet 18' having indicia associated therewith corresponding to the indicia shown in FIG. 1 and transparent in areas immediately above respective lamps within the body 25. The internal circuitry of the embodiment of FIG. 6 is substantially identical to that of the previously described embodiment with the schematic of FIG. 7 equally applying. The input leads 6' are ribbons of spring steel embedded in the body 25 and attached at their inner ends to the test circuitry. The outer ends of the input leads 6 are reversely outwardly bent so that they are substantially U-shaped at their ends and embedded or otherwise rigidly secured to the body 25 at their terminal outer ends. Thus, each of the input leads 6' is in the form of a spring loop that will yield when engaging the leads of the flat pack to be tested to form good electrical contact and compensate for any irregularity in the spatial association of the leads on the flat pack to be tested. Further modifications and variations are contemplated.

OPERATION

When it is desired to test or analyze the logic of a dual-in-line, flat pack, or other form of integrated circuit as it operates in its associated circuit, the analyzer of the present invention is removed from the pocket of the operator and placed in position over the flat pack or DIL to be tested, so that the body of the integrated circuit is guidingly received within the head 4 and the input leads 6 are pressed into electrical contact with the associated leads of the circuit to be tested. The slots 8 guiding the leads 6 as they are pressed by the leads of the integrated circuit to be tested so that there will be no electrical contact between leads 6. If the integrated circuit being tested is not receiving power, the lamp in position 4, that is, L4 will not light. If the integrated circuit to be tested is under power in circuit, the analyzer of the present invention will receive power therefrom through the input lead 4D for operating the lamp drivers 23, which will respectively drive the remaining lamps 5 for analyzing the logic function associated with each of the corresponding leads of the integrated circuit to be tested. If the integrated circuit being tested is operating in circuit properly, a plurality of the lamps 5 will be lit while others will remain unlit for example as determined by the manner in which the integrated circuit to be tested is designed to operate in circuit. A suitable chart or other printed instruction material will be provided with the analyzer of the present invention to show which lamps 5 are to be lit and which lamps are to remain unlit for each manner in which the integrated circuit to be tested is connected in circuit. In this manner, any SUHL-type DIL or other integrated circuit may be tested as it operates in circuit relationship with other components no matter in what manner it is connected. Although a preferred embodiment of the present invention has been illustrated, along with a variation, it is contemplated that the principles of the present invention may be employed with other types of DIL integrated circuits, with materially different shapes, number of leads, etc.

FIG. 8a–7d of the drawings illustrates still another form of the invention wherein the integrated circuit analyzer includes flexible lead means comprised by a plurality of individual, insulated, flexible conductors 31 which are connected directly to respective ones of the input leads 6 of head 4 as shown in FIG. 5 of the drawings. The remaining ends of the flexible conductors 31 are connected to respective ones of a plurality of similar leads secured within a detachable spring clip connector 32. The leads secured within the detachable spring clip connector 32 form leaf springs in much the same manner as the input leads 6 and are exposed so that upon attachment of the spring clip connector 32 over the input leads of an integrated circuit to be tested, good electrical contact is made to the respective leads of the integrated circuit under test. With this arrangement, the flexible lead means 31 and detachable spring clip connector 32 can be employed to secure the integrated circuit logic analyzer to otherwise inaccessible or hard-to-reach integrated circuits mounted in locations where otherwise the analyzer could not be used. Other forms of clasp-like connectors readily could be employed with flexible leads 31 in place of the spring clip to accomplish the same object. Thus by providing the integrated circuit analyzer with interchangeable heads 4 one of which includes the flexible leads 31 and spring clip connector 32, greater flexibility of use for the analyzer is obtained.

Having described several embodiments of a pocket size integrated circuit logic analyzer constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

I claim:

1. Unitary, self-contained, hand portable logic circuit checking equipment for testing an energized integrated circuit device while the device is mounted on a circuit board and thus incorporated into a digital logic electronic circuit, comprising a multiple contact head having a plurality of electrical contacts of number and arrangement to make simultaneous electrical connection with the lead pins of the integrated circuit device being tested; a body having distinct individual illuminable indicia, including a first indicia and a plurality of identical indicia, one set for each of said electrical contacts in excess of two contacts, each of said identical indicia representing the logic state of the corresponding pin of said integrated circuit device being tested; illuminating means for said indicia; and electronic circuitry interconnecting said illuminating means and said contacts and including a power circuit interconnecting the two said contacts which are adapted to make electrical connection with the power supply and ground lead pins of said device and the illuminating means associated with said first indicia; and signal circuits interconnecting said contacts other than said two contacts and the illuminating means for said indicia other than said first indicia, said signal circuit each interconnecting one contact and the illuminating means associated with the corresponding indicia set and including solid state electronics means responsive to the logic significant potential appearing at the corresponding pin and electrically connected to that contact to energize and cause operation of said illuminating means in response to the logic state of the corresponding pin of said integrated circuit device by means of power available in said power circuit and the potential at said pins whereby said first indicia is illuminated when the device is energized so that said plurality of identical indicia are illuminated in a pattern to indicate the digital logic status of said device at said lead pins other than the lead pins carrying power and ground.

2. The equipment of claim 1 wherein there are 14 said contacts arranged in an equipment head for mating registration with a 14 lead integrated circuit flat package device.

3. The equipment of claim 1 wherein there are 14 contacts arranged for mating with a 14 pin dual in-line digital logic integrated circuit device.

4. The equipment of claim 1 wherein there are 24 contacts arranged for mating with a 24 pin digital logic integrated circuit device.

5. The equipment of claim 1 wherein there are 16 contacts arranged for mating with a 16 pin digital logic integrated circuit device.

6. The equipment of claim 1 wherein said head is replaceable whereby the equipment may be used with devices of the same configuration but with different pins for power and ground.

7. A unitary, selfcontained, portable, hand held circuit logic analyzer for testing an integrated circuit device in its position of utilization without disturbing its physical and electrical relationship with its environment, comprising; a head shaped to fit said integrated circuit device and containing a plurality of $n + 2$ electrical contacts of location and dimension to mate with the input and output lead pins of said device, said device having n logic pins, a power pin and a ground pin; an indicator face portion including $n + 2$ visual indicator positions; and a body portion interconnecting said head and said face portion and housing electrical circuit means for causing display of the digital logic status of said device at said indicator positions as detected by said electrical contacts from said pins; said indicator positions including distinguishing indicia to permit correlation of each said indicator position with one said electrical contact and one said pin and further including illuminating means containing lamp means associated with $n + 1$ of said positions to display signals indicating the digital logic status at n of said pins and indicating whether or not power is available at said power pin; said circuit means including n identical driving circuits connected to a common power terminal and to a common ground terminal and interconnecting n corresponding electrical contacts and illuminating means, each driving circuit including a lamp driver responsive to the logic state potential detected by said contact and to an operating current available at said power terminal to turn on, turn off and operate said lamp means responsive to said potential to create said signals, said circuit means also connecting said ground terminal to one said electrical contact located so as to register with the ground pin of said device and interconnecting said power terminal, the one said lamp means in excess of n and the one said electrical contact located to register with the power pin of said device, whereby said analyzer may be used to test an operating integrated circuit device and when applied to such integrated circuit device will indicate whether or not the device is under power and will indicate the logic status at each logic input and output to permit determination of whether said device is proper or defective.

8. The analyzer of claim 7 wherein there are 14 said electrical contacts and said head and contacts will mate with a 14 pin SUHL type integrated circuit package.

9. The analyzer of claim 7 wherein said body portion consists in part of flexible lead wires between said head and the remainder of said body portion.

* * * * *